US009720395B2

(12) United States Patent
Shi et al.

(10) Patent No.: US 9,720,395 B2
(45) Date of Patent: Aug. 1, 2017

(54) SYNCHRONIZATION CONTROL FOR RECONNECTING MICROGRID TO MAIN GRID AFTER ISLANDING

(71) Applicants: Di Shi, San Jose, CA (US); Ratnesh Sharma, Fremont, CA (US); Yusheng Luo, Las Cruces, NM (US)

(72) Inventors: Di Shi, San Jose, CA (US); Ratnesh Sharma, Fremont, CA (US); Yusheng Luo, Las Cruces, NM (US)

(73) Assignee: NEC Corporation (JP)

( * ) Notice: Subject to any disclaimer, the term of this patent is extended or adjusted under 35 U.S.C. 154(b) by 113 days.

(21) Appl. No.: 14/543,969

(22) Filed: Nov. 18, 2014

(65) Prior Publication Data
US 2016/0266559 A1 Sep. 15, 2016

Related U.S. Application Data

(60) Provisional application No. 61/947,616, filed on Mar. 4, 2014.

(51) Int. Cl.
| | |
|---|---|
| H02J 3/40 | (2006.01) |
| H02J 3/42 | (2006.01) |
| H02J 3/44 | (2006.01) |
| G05B 19/042 | (2006.01) |

(52) U.S. Cl.
CPC .... *G05B 19/042* (2013.01); *G05B 2219/2639* (2013.01)

(58) Field of Classification Search
CPC .................................................. G05B 19/042
USPC .................................................. 700/286, 287
See application file for complete search history.

(56) References Cited

U.S. PATENT DOCUMENTS

| | | | | |
|---|---|---|---|---|
| 2003/0165036 A1* | 9/2003 | Tuladhar | ............... | H02J 3/38 361/62 |
| 2004/0140674 A1* | 7/2004 | Nguyen | ............... | F01D 13/00 290/52 |
| 2005/0200205 A1* | 9/2005 | Winn | ............... | H02J 9/062 307/64 |
| 2015/0061298 A1* | 3/2015 | Panosyan | ............... | H02P 9/04 290/40 B |

OTHER PUBLICATIONS

Best, R., et al. "Synchrophasor Broadcast Over Internet Protocol for Distributed Generator Synchronization" IEEE Transactions on Power Delivery, vol. 25, No. 4. Oct. 2010. pp. 2835-2841.

Assis, T., et al. "Automatic Reconnection From Intentional Islanding Based on Remote Sensing of Voltage and Frequency Signals" IEEE Transactions on Smart Grid, vol. 3, No. 4. Dec. 2012. pp. 1877-1884.

\* cited by examiner

*Primary Examiner* — Mark Connolly
(74) *Attorney, Agent, or Firm* — Joseph Kolodka

(57) ABSTRACT

A method and system are provided. The method includes synchronously reconnecting a microgrid to a main grid after islanding of the microgrid. The synchronously reconnecting step includes calculating a phase angle difference between synchrophasor measurements collected from a common coupling on the main grid and synchrophasor measurements collected from a common coupling on the microgrid. The synchronously reconnecting step further includes calculating, by a controller, a frequency reference deviation based on the phase angle difference. The synchronously reconnecting step also includes adjusting a frequency of the diesel generator based on the frequency reference deviation.

18 Claims, 6 Drawing Sheets

SYNCHRONIZATION CONTROL FOR RECONNECTING MICROGRID TO MAIN GRID AFTER ISLANDING

RELATED APPLICATION INFORMATION

This application claims priority to provisional application Ser. No. 61/947,616 filed on Mar. 4, 2014, incorporated herein by reference.

BACKGROUND

Technical Field

The present invention relates to power systems, and more particularly to synchronization control for reconnecting a microgrid to a main grid after islanding.

Description of the Related Art

With increasing penetration of distributed energy resources, the microgrid concept is used to enhance the reliability of power systems by integrating distributed generators (DGs) with a load in a local distribution network. A microgrid can operate under both grid-tied mode and islanded mode. Under the grid-tied mode, it is connected to a medium voltage network, either absorbing power from or injecting power into the main grid. In the case of an emergency, the microgrid is disconnected from the main grid and starts working autonomously, in a similar way to physical islands. There are many technical difficulties in microgrid islanding and perhaps the most challenging one is the out-of-phase reclosing. After islanding, a microgrid will accelerate or decelerate due to power imbalance, losing synchronization with the main grid. When an event (scheduled maintenance/fault/etc.) that triggers islanding disappears, the circuit breaker (CB) or re-closer will try to connect the microgrid back to the main grid. At the moment of reconnection, lack of synchronization can lead to severe consequences. For example, if the difference in voltage phase angles across the circuit breaker reaches 60 degrees, voltage across the circuit breaker will be around 1 pu. If reconnection occurs at this time instant, the voltage difference will induce a huge inrush of current flowing between the main grid and the distributed generators, causing system oscillations or potential damage to equipment. A larger inrush current can be induced if the two systems are completely out of phase. To achieve a smooth and successful reconnection, the voltage at the PCC (point of common coupling) on the microgrid side must be synchronized with that on the utility grid side.

SUMMARY

These and other drawbacks and disadvantages of the prior art are addressed by the present principles, which are directed to synchronization control for reconnecting a microgrid to a main grid after islanding.

According to an aspect of the present principles, a method is provided. The method includes synchronously reconnecting a microgrid to a main grid after islanding of the microgrid. The synchronously reconnecting step includes calculating a phase angle difference between synchrophasor measurements collected from a common coupling on the main grid and synchrophasor measurements collected from a common coupling on the microgrid. The synchronously reconnecting step further includes calculating, by a controller, a frequency reference deviation based on the phase angle difference. The synchronously reconnecting step also includes adjusting a frequency of the diesel generator based on the frequency reference deviation.

According to another aspect of the present principles, a system is provided. The system includes a controller for synchronously reconnecting a microgrid to a main grid after islanding of the microgrid. The controller includes a processor-based phase angle difference calculator for calculating a phase angle difference between synchrophasor measurements collected from a common coupling on the main grid and synchrophasor measurements collected from a common coupling on the microgrid. The controller further includes a frequency reference deviation controller for calculating a frequency reference deviation based on the phase angle difference. The controller also includes a frequency adjuster for adjusting a frequency of the diesel generator based on the frequency reference deviation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to synchronization control for reconnecting a microgrid to a main grid after islanding.

In accordance with the present principles, a control strategy is proposed to synchronize a microgrid with a main grid so that seamless reconnection there between can be achieved after islanding. The synchronization is achieved by eliminating the voltage phase angle difference across the circuit breaker/re-closer at the point of common coupling (PCC). The voltage phase angle difference is input into a digital controller (e.g., a digital PI controller), the output of which is a frequency adjustment that needs to be added to the frequency reference of a diesel engine controller. Based on the adjusted frequency reference, the diesel engine controller speeds up or slow down the diesel generator. The proposed control employs synchrophasor measurements transmitted via Internet Protocol (IP) communication. Of course, other communication protocols can also be used, while maintaining the spirit of the present principles.

Figure 1:
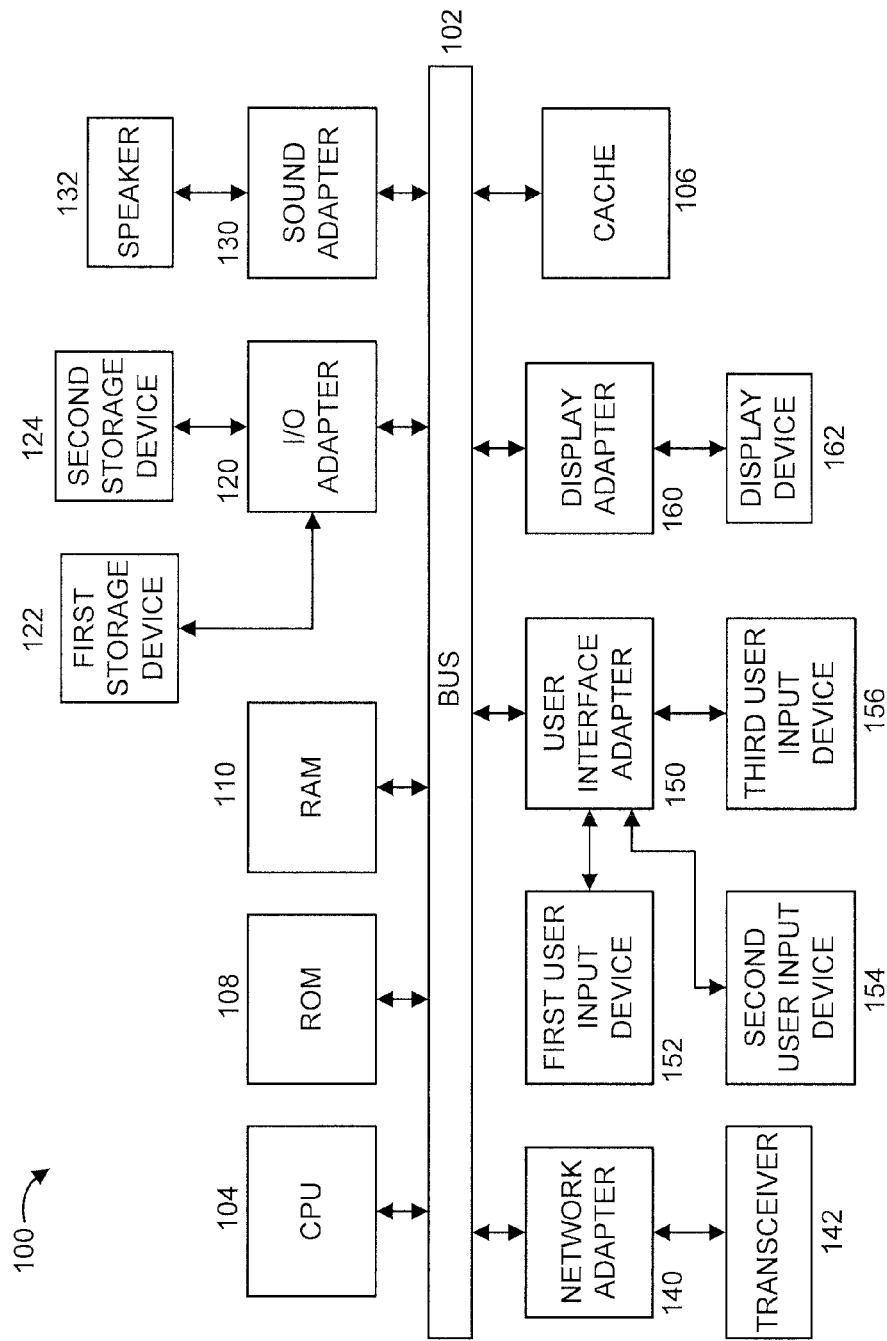
FIG. 1 shows an exemplary processing system 100 to which the present principles may be applied, according to an embodiment of the present principles.

FIG. 1 shows an exemplary processing system 100 to which the present principles may be applied, according to an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
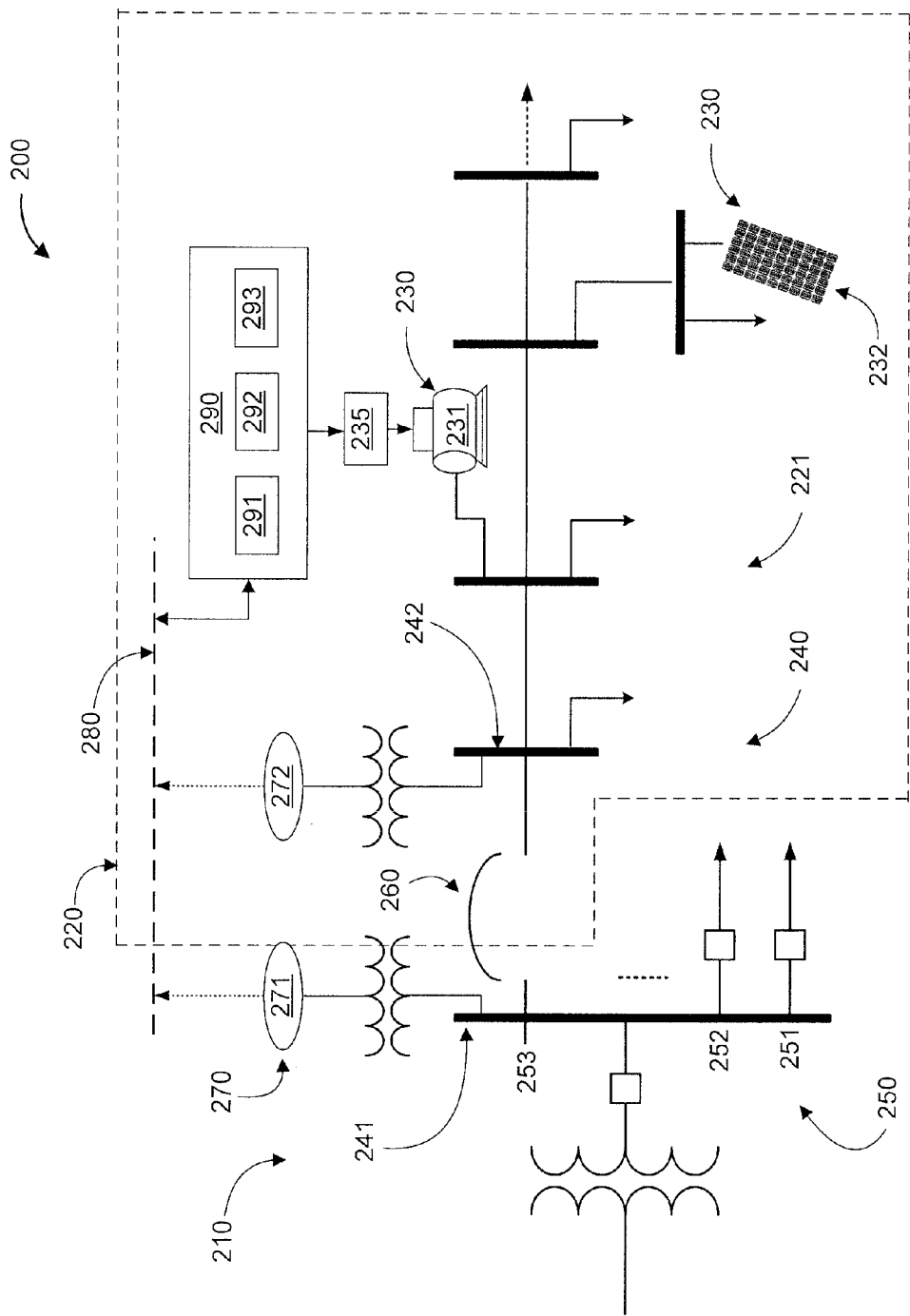
FIG. 2 shows an exemplary architecture for a system 200 for synchronization control for reconnecting a microgrid to a main grid after islanding, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
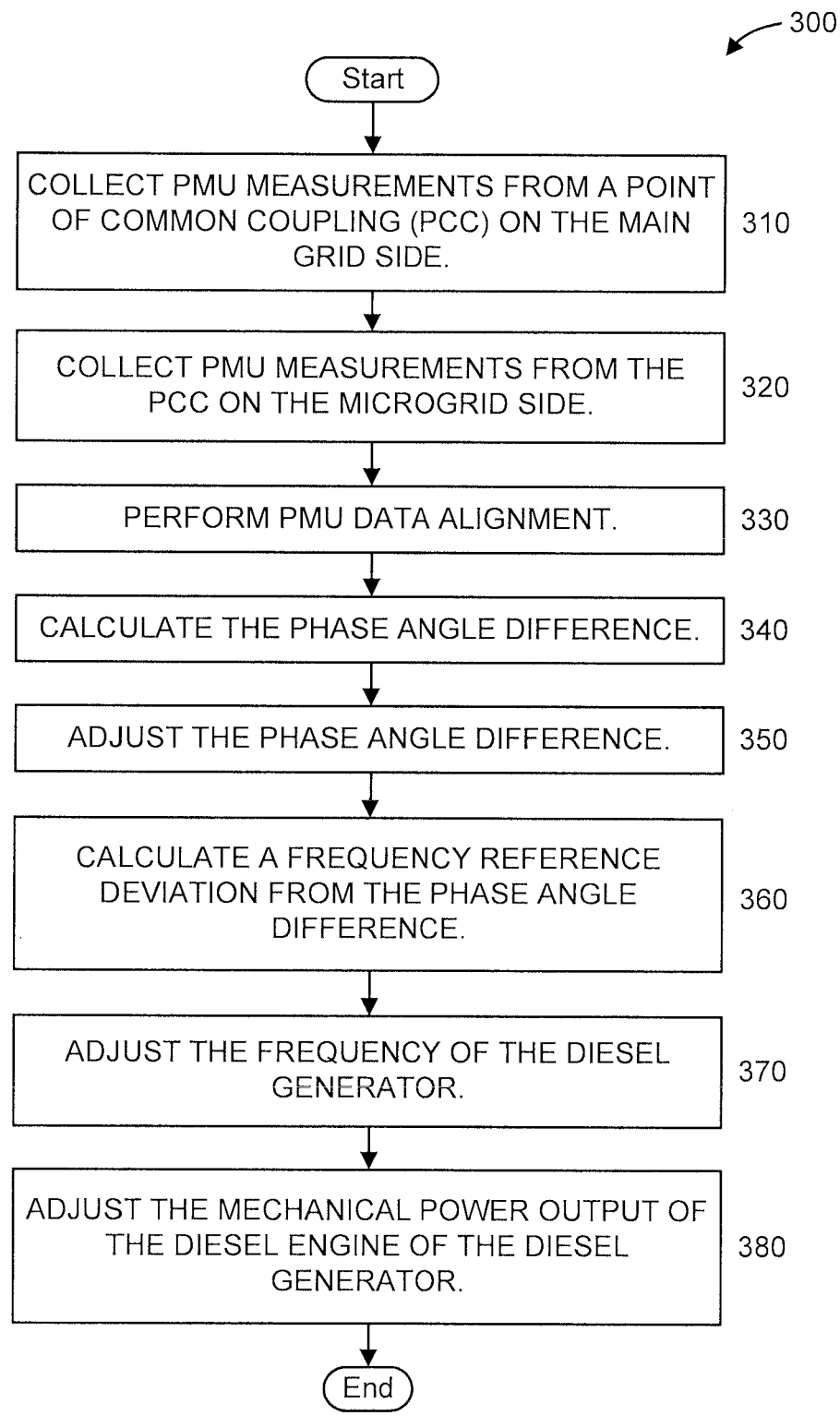
FIG. 3 shows an exemplary method 300 for synchronization control for reconnecting a microgrid to a main grid after islanding, in accordance with an embodiment of the present principles.
Figure 4:
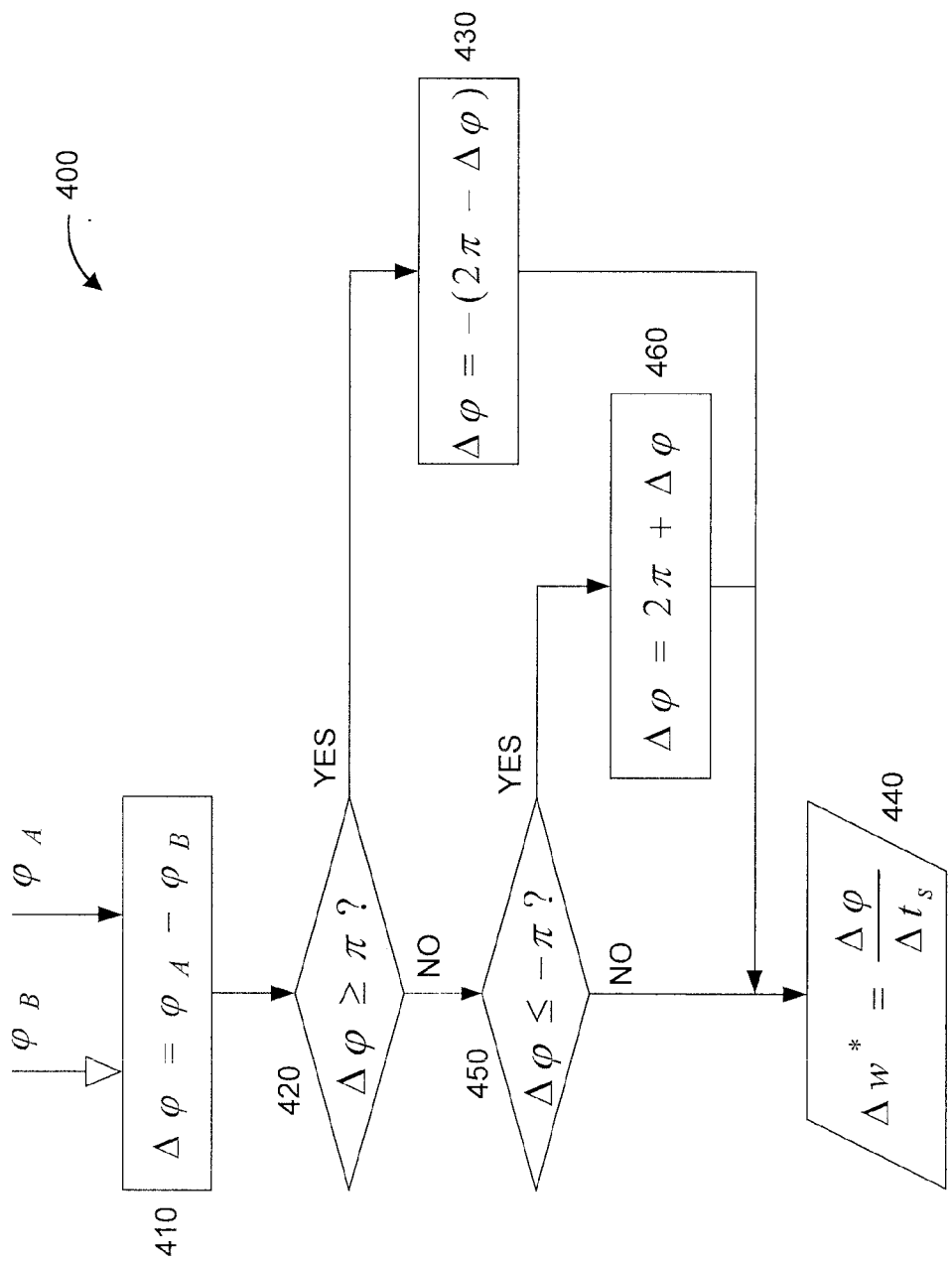
FIG. 4 shows an exemplary method 400 for performing a phase angle difference adjustment, in accordance with an embodiment of the present principles.

Further, it is to be appreciated that processing system 100 may perform at least part of the methods described herein including, for example, at least part of method 300 of FIG. 3 and/or at least part of method 400 of FIG. 4. Similarly, part or all of system 200 may be used to perform at least part of method 300 of FIG. 3 and/or at least part of method 400 of FIG. 4.

A description will now be given of synchronization control of a distributed generator for microgrid reconnection, in accordance with an embodiment of the present principles.

The present principles propose a synchronization control framework for microgrid resynchronization and reconnection purpose using synchronized phasor measurements collected from phasor measurement units (PMUs) which are also known as synchrophasors. The synchronization is achieved by eliminating the voltage phase angle mismatch across circuit breaker/re-closer at point of common coupling.

A description will now be given of a control architecture for microgrid reconnection, in accordance with an embodiment of the present principles.

FIG. 2 shows an exemplary distribution system 200 to which the present principles can be applied, in accordance with an embodiment of the present principles.

The system 200 includes a utility grid (hereinafter also "main utility grid", or "main grid" in short) 210, a microgrid 220, multiple distributed generators 230 (e.g., a diesel generator 231 and a photovoltaic (PV) system 232), buses 240 (bus 241, bus 242), feeders 250 (feeder 251, feeder 252, feeder 253), and a static switch/circuit breaker/re-closer (hereinafter "static switch" or "SS") 260.

As shown, the microgrid 220 with the diesel generator 231 and the PV system 232 is connected to the main utility grid 210 at bus 241 through the static switch 260. The microgrid 220 also includes multiple loads 221 dispersed at different locations. When the static switch 260 opens, the microgrid 220 is islanded from the main grid 210.

The system 200 further includes two phasor measurement units (PMUs) 271 and 272, a dedicated communication channel 280, and a digital controller (also interchangeably referred to herein "synchronization controller") 290 to realize the synchronization control. The digital controller 290 is closed to and directly interfaced to the engine control unit 235 of the diesel generator 231. While shown separate from the diesel generator 231 in FIG. 2, in other embodiments, the engine control unit 235 can be included in and part of the diesel generator 231.

The two PMUs 271 and 272 are installed at two buses (bus 241 and bus 242, respectively) to which the static switch 260 are directly connected. Bus 241 is on the main utility grid side and bus 242 is on the microgrid side. Voltage phase angle measurement is needed for the synchronization control.

FIG. 3 shows a method 300 for synchronization control for reconnecting a microgrid to a main grid after islanding, in accordance with an embodiment of the present principles.

At step 310, collect PMU measurements from a point of common coupling (PCC) on the main grid side.

At step 320, collect PMU measurements from the PCC on the microgrid side.

At step 330, perform PMU data alignment.

At step 340, calculate the phase angle difference.

At step 350, adjust the phase angle difference.

At step 360, calculate a frequency reference deviation from the phase angle difference.

At step 370, adjust the frequency of the diesel generator 231.

At step 380, adjust the mechanical power output of the diesel engine of the diesel generator 231. In an embodiment, the mechanical power output of the diesel engine is modified responsive to the adjusted frequency per step 370.

We now describe an exemplary placement of the PMUs 271 and 272, in accordance with an embodiment of the present principles. Referring back to FIG. 2, a dedicated communication channel 280 (e.g., a dedicated Ethernet communication channel) is used. With this communication channel 280, the measurements from the two PMUs 271 and 272 can be received by the digital controller 290 close to the diesel generator 231. User datagram protocol (UDP) multicast can be used as the communication protocol for the PMUs 271 and 272. Multicast is the delivery of a message or information to a group of destination computers simultaneously in a single transmission from the source. Therefore, the PMU measurements can be shared by other users for different purposes. Both the voltages and frequencies at buses 241 and 242 are measured and sent to the digital controller 290.

We now describe the processing of PMU data for synchronization control, in accordance with an embodiment of the present principles. The PMUs 271 and 272 have the capability of precisely tagging the timestamp of voltage and current measurements. With the timestamp, it is possible to compare measurements collected from different locations taken at the same time instant. PMU data received by the digital controller 290 from the two sources (buses 241 and 242) need to be aligned to make sure measurements at the same time instant are compared and used for the synchronization control. Also, adjustments need to be made to the phase angle measurements so that the right control action can be made.

We now describe PMU data alignment, in accordance with an embodiment of the present principles. A data alignment method is proposed herein. In order to receive PMU measurements from the communication network, a socket 293 and associated memory buffers 291 and 292 need to be set up by the synchronization controller 290. As soon as the socket is created, the synchronization controller 290 starts to receive and store PMU measurements to the memory buffers 291 and 292, in the same sequence as when the data frame is received. Assuming the two PMUs 271 and 272 have the same reporting rate, this method compares the timestamps of the earliest received data from each buffer. For example, if buffer 291 is leading buffer 292, the time difference (ΔT) is calculated as follows:

$$\Delta T = T_2^1 - T_1^1 \quad (1)$$

where $T_i^j$ represents the timestamp of the $j^{th}$ measurement from buffer i. Then the number of measurements (N) by which buffer 291 is leading buffer 292 can be calculated as follows:

$$N = \Delta T \cdot F_S \quad (2)$$

where $F_S$ is the phasor reporting rate of the two PMUs. Finally, data alignment can be conducted by removing the first N data from buffer 291. In general, for a dedicated communication network, we can assume there is no loss of data in the communication channel; and therefore data alignment only needs to be conducted once at the very beginning when the controller starts.

We now describe phasor extrapolation, in accordance with an embodiment of the present principles. If the two PMUs 271 and 272 have different reporting rates, then phasor extrapolation is needed. For example, if PMU 271 at bus 241 has a higher reporting rate than PMU 272 at bus 242, voltage phase angle measurements from PMU 271 at bus 241 need to be adjusted so that voltage phase angles at the same time instant can be compared and phase difference can be calculated. The following equation should be used to estimate the phase angle measurement at time instant $t_1$ based on phase angle and frequency measurements at time instant $t_2$:

$$\phi_x(t_1) = \phi_x(t_2) + (t_1 - t_2) \cdot f_x(t_2) \quad (3)$$

where $\phi_x(t_1)$ represents the voltage phase angle measurement (to be estimated) from bus x (x=241 or 242) at time instant $t_1$, $f_x(t_2)$ is the actual frequency measurement from the same bus x at time instant $t_2$, and $\phi_x(t_2)$ is the actual phase angle measurement from the same bus x at time instant $t_2$. We note that while different reporting rates are described, the preceding methodology can also be applied to different collecting rates of the synchrophasor measurements.

We now describe phase angle difference adjustment, in accordance with an embodiment of the present principles. The phase angle difference ($\phi_A - \phi_B$ or $\Delta\delta$) needs to be adjusted before it is fed into the controller 290. This is mainly due to the periodic feature of the sine wave. For example, if $\phi_A$ is 5 degree while $\phi_B$ is 355 degree, we can claim that $\phi_A$ leads $\phi_B$ by 10 degrees. However, it is also reasonable to claim that $\phi_B$ is leading $\phi_A$ by 350 degrees. To solve this issue, we limit the phase angle difference to within the range between −180 degrees to 180 degrees.

FIG. 4 shows a method 400 for performing a phase angle difference adjustment, in accordance with an embodiment of the present principles.

At step 410, receive $\phi_A$ and $\phi_B$, and calculate $\Delta\phi = \phi_A - \phi_B$.

At step 420, determine whether or not. If so, the method continued to step 430. Otherwise, the method continues to step 450.

At step 430, $\Delta\phi = -(2\pi - \Delta\phi)$.

At step 440, $$\Delta w^* = \frac{\Delta\varphi}{\Delta t_s},$$

where $\Delta t_s$ denotes the time interval between two PMU measurements.

At step 450, determine whether or not $\Delta\phi \leq -\pi$. If so, the method continued to step 460. Otherwise, the method continues to step 440.

At step 460, $\Delta\phi = 2\pi + \Delta\phi$.

We now describe control of the diesel generator 231 for microgrid synchronization, in accordance with an embodiment of the present principles. This solution provides a control strategy to synchronize the microgrid 220 with the main grid 210 so that both the errors in frequency and voltage phase angle can be eliminated.

Figure 5:
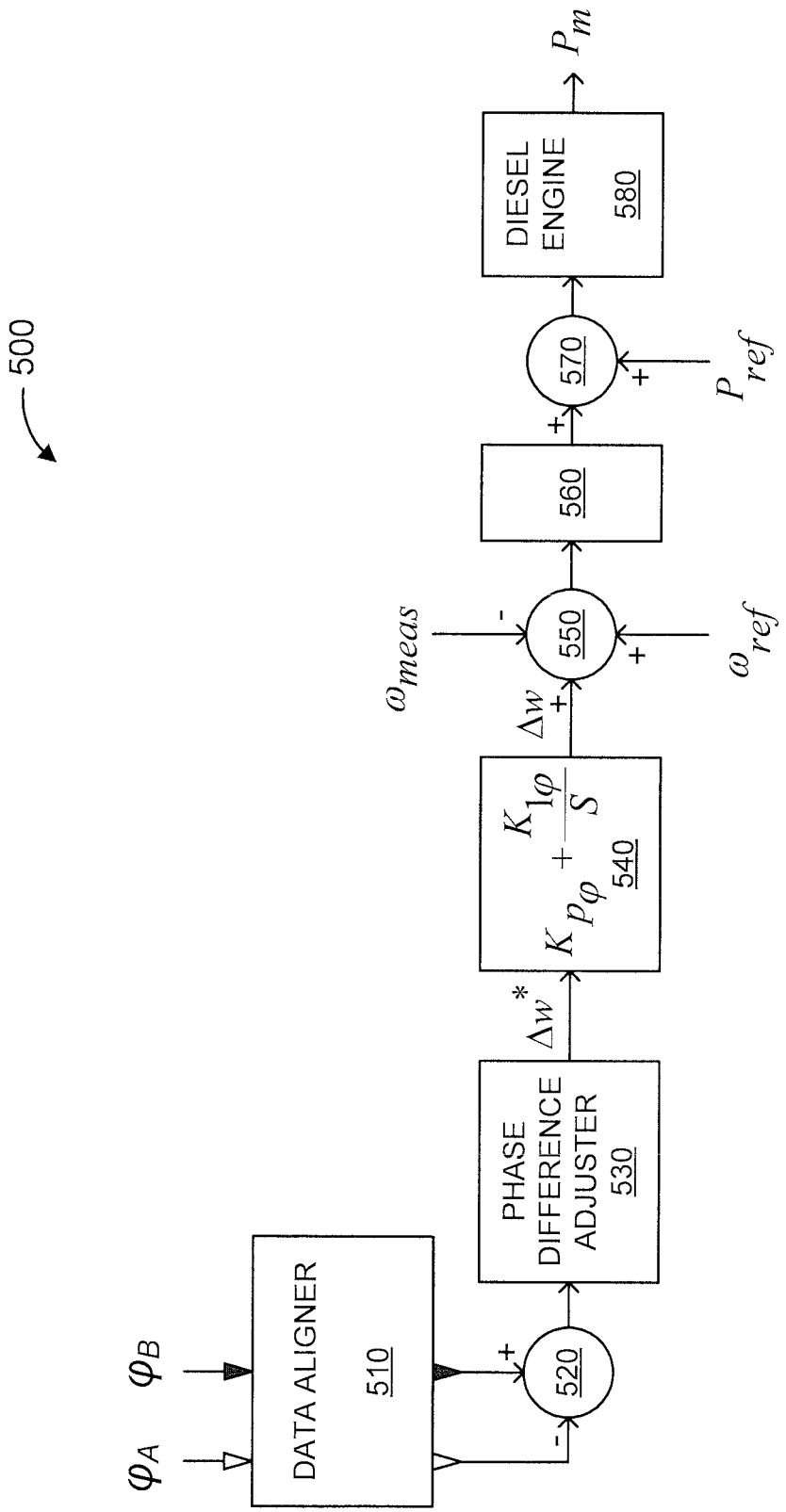
FIG. 5 shows an exemplary synchronization controller 500 for performing synchronization control of a diesel generator 231, in accordance with an embodiment of the present principles.

FIG. 5 shows an exemplary synchronization controller 500 for performing synchronization control of a diesel generator 231, in accordance with an embodiment of the present principles. While FIG. 5 is described with respect to the diesel generator 231, it is to be appreciated that system 500 can be applied to other types of distributed generators, while maintaining the spirit of the present principles. The basic idea of the proposed control is to synchronize the voltage phase angle at bus A with bus B by speeding up or slowing down the diesel generator 231. In an embodiment, controller 290 can be implemented as controller 500.

The synchronization controller 500 includes a data aligner 510, a combiner 520, a phase difference adjuster 530, and a proportional-integral (PI) controller 540. The output (Δw) of the synchronization controller 500 is then provided to other elements, including a combiner 550, a speed governor 560, a combiner 570, and a diesel engine power modifier 580.

Synchrophasors $\phi_A$ and $\phi_B$ stored in buffers 291 and 292 are aligned through data aligner 510 as described herein. The phase angle difference ($\phi_A - \phi_B$ or $\Delta w^*$) is calculated through combiner 520 and then adjusted through phase difference adjuster 530. The phase angle difference (Δw*) is passed into the digital PI controller 540. The output Δw of the PI controller 540 is supplied as an auxiliary input to the combiner 550 (along with a $w_{ref}$ signal and a $w_{meas}$ signal) and then added to the frequency reference for the speed governor 560 of the diesel generator 231. The combiner 570 combines the output of the speed governor 560 with a $P_{ref}$ signal. The output of the combiner 570 is provided as an input to the diesel engine power modifier 580. The diesel engine power modifier 580 calculates a control signal $P_m$ for modifying the mechanical power output of the diesel engine of diesel generator 231. The control signal $P_m$ is then provided to the engine control unit 235 of the diesel generator 231.

We now describe a master/slave strategy, in accordance with an embodiment of the present principles.

Various types of distributed generators can exist in a microgrid, including micro-turbine, photovoltaic system, fuel cell, battery storage, geothermal system, and so forth. These distributed generators are interfaced to the microgrid either through power electronic converters or through ac rotating machines. In the grid-connected mode, the output voltage and frequency of the distributed generators follow the main grid. In islanded mode, at least one distributed generator needs to stand out as a master unit to actively regulate the voltage and frequency of the microgrid while the remaining distributed generators will follow the master(s).

In the islanded operating mode, the diesel generator 231 behaves as the master unit that provides both voltage and frequency references for the system, and the PV system 232 follows the diesel generator output. Therefore, synchronization of the microgrid 220 with the main grid 210 can be achieved by controlling the output of the diesel generator 231.

We now describe the digital/discrete controller 290, in accordance with an embodiment of the present principles.

In the provided solution, the following digital controller 290 is used:

$$\Delta w_n = K_P \cdot \Delta w_n^* + K_I \cdot \Delta T \cdot \sum_{i=1}^{n} \Delta w_i^* \quad (4)$$

where ΔT is the time difference between which two consecutive PMU measurements are taken. However, it is to be appreciated that other digital control approaches can also be used, while maintaining the spirit of the present principles.

We now describe frequency reference adjustment, in accordance with an embodiment of the present principles.

As shown in FIG. 5, voltage phase angle difference ($\phi_A - \phi_B$), after passing through certain adjustment, is input into a digital controller. The output of the controller 500 is a frequency bias that needs to be added to the frequency reference ($w_{ref}$) of the diesel generator 231. Accordingly, the mechanical power output of the diesel engine will be adjusted via the engine control unit 235 of the diesel generator 231. For example, if $\phi_A$ is leading $\phi_B$, the phase angle difference is positive and the frequency bias would be positive. As a result, the diesel engine will increase its mechanical output to speed up the diesel generator 231 to eliminate the phase angle mismatch.

We now describe integration of the present principles with existing controls of a diesel generator, in accordance with an embodiment of the present principles.

Figure 6:
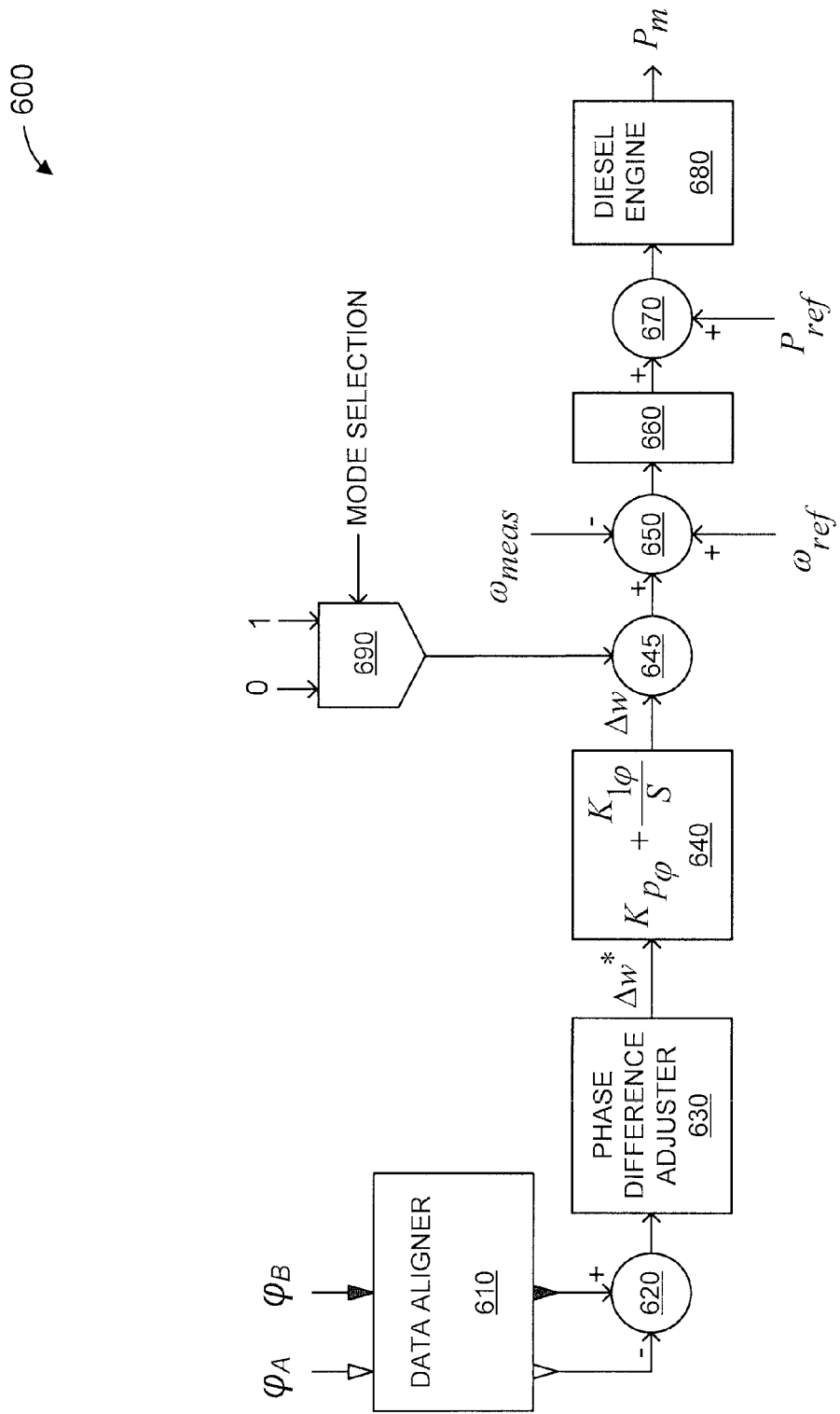
FIG. 6 shows an exemplary synchronization controller 600 for performing synchronization control integrated with an existing distributed generator control, in accordance with an embodiment of the present principles.

The proposed control can be easily integrated with the existing control of the diesel generator, as shown in FIG. 6. FIG. 6 shows an exemplary synchronization controller 600 for performing synchronization control integrated with an existing distributed generator control, in accordance with an embodiment of the present principles. In an embodiment, controller 290 can be implemented as controller 600.

The synchronization controller 600 includes a data aligner 610, a combiner 520, a phase difference adjuster 630, a proportional-integral (PI) controller 640, a mixer or multiplier 645, and a mode selection unit 290. The output (Δw) of the synchronization controller 600 is then provided to other elements, including a combiner 650, a speed governor 660, a combiner 670, and a diesel engine power modifier 680.

Synchrophasors $\phi_A$ and $\phi_B$ stored in buffers 291 and 292 are aligned through data aligner 610 as described herein. The phase angle difference ($\phi_A - \phi_B$ or Δw*) is calculated through combiner 620 and then adjusted through phase difference adjuster 630. The phase angle difference (Δw) is passed into the digital PI controller 640. The output Δw of the PI controller 640 is multiplier by the output of the mode selection unit 690 and then supplied as an auxiliary input to combiner 650 (along with a $w_{ref}$ signal and a $w_{meas}$ and then added to the frequency reference for the speed governor 660 of the diesel generator 231. The combiner 670 combines the output of the speed governor 660 with a $P_{ref}$ signal. The output of the combiner 670 is provided as an input to the diesel engine power modifier 680. The diesel engine power modifier 680 calculates a control signal $P_m$ for modifying the mechanical power output of the diesel engine in diesel generator 231. The control signal $P_m$ is then provided to the engine control unit 235 of the diesel generator 231.

With the mode selection unit 690, the synchronization control can be blocked when the microgrid 120 is grid-tied to the main grid 110 by setting the mode to 0. When reconnection is needed in the islanded mode, the proposed control can be activated by setting this mode to 1. Of course, the preceding values are merely illustrative and, thus, other values can also be used.

A description will now be given regarding some of the many attendant benefits/advantages provided by the present principles.

The present principles receive PMU measurements from the PCC on both sides of the re-closer/circuit breaker/static switch. The present principles calculate the phase angle difference between microgrid and the main grid. The present principles adjust phase angle difference and input the difference into a controller to obtain a frequency reference deviation. The present principles adjust the speed of the diesel generator based on the frequency reference deviation.

A description will now be given regarding some of the many attendant competitive/commercial values of the solution provided by the present principles.

The proposed solution can realize the seamless transition of a microgrid from islanded operating mode to grid-tied mode without shutting down the distributed generators. The proposed solution can be directly integrated to the existing control of diesel generators with lower cost. Synchronization of the microgrid can be achieved in a faster manner. The proposed control is robust to communication delays and is still effective under system transient and large disturbance.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method, comprising:
    synchronously reconnecting a microgrid to a main grid after islanding of the microgrid, wherein said synchronously reconnecting step comprises:
        calculating a phase angle difference between synchrophasor measurements collected from a common coupling on the main grid and synchrophasor measurements collected from a common coupling on the microgrid;
        calculating, by a controller, a frequency reference deviation based on the phase angle difference; and
        adjusting a frequency of the diesel generator based on the frequency reference deviation;
    wherein the data alignment comprises:
        storing the synchrophasor measurements from the point of common coupling on the main grid in a first buffer;
        storing the synchrophasor measurements from the point of common coupling on the main grid in a second buffer;
        determining, from measurement receive times at the first and second buffers, a leading one of the synchrophasor measurements from the point of common coupling on the main grid and the synchrophasor measurements from the point of common coupling on the microgrid; and
        removing, from a corresponding one of the first buffer or the second buffer, a number of measurements from the leading one.

2. The method of claim 1, further comprising performing data alignment to align the synchrophasor measurements collected from the point of common coupling on the main grid with the synchrophasor measurements collected from the point of common coupling on the microgrid in preparation for said calculating step.

3. The method of claim 1, further comprising adjusting a mechanical power output of the diesel generator.

4. The method of claim 1, further comprising receiving the synchrophasor measurements over a communication channel using User Datagram Protocol multicast.

5. The method of claim 1, further comprising extrapolating synchrophasor measurement values when the synchrophasor measurements from the point of common coupling on the main grid and the synchrophasor measurements from the point of common coupling on the microgrid are at least one of collected using different collection rates and reported using different reporting rates.

6. The method of claim 1, wherein said step of adjusting the frequency of the diesel generator based on the frequency reference deviation comprises synchronizing a voltage phase angle at the common coupling on the main grid with a voltage phase angle at the common coupling on the microgrid.

7. The method of claim 1, wherein the microgrid comprises a plurality of distributed generators, and the method further comprises:
    configuring one of the plurality of distributed generators as a master distributed generator; and
    configuring remaining ones of the plurality of distributed generators as slave distributed generators that follow an output voltage and an output frequency of the master distributed generator.

8. The method of claim 1, further comprising disabling the method responsive to a received mode selection for an island mode that islands the microgrid from the main grid.

9. The method of claim 1, further comprising enabling the method responsive to a received mode selection for a grid-tied mode that ties the main grid to the microgrid.

10. A method, comprising:
    synchronously reconnecting a microgrid to a main grid after islanding of the microgrid, wherein said synchronously reconnecting step comprises:
        calculating a phase angle difference between synchrophasor measurements collected from a common coupling on the main grid and synchrophasor measurements collected from a common coupling on the microgrid;
        calculating, by a controller, a frequency reference deviation based on the phase angle difference;
        adjusting a frequency of the diesel generator based on the frequency reference deviation; and
        adjusting the phase angle difference to lie within a predetermined range before calculating the frequency reference deviation therefrom.

11. A non-transitory article of manufacture tangibly embodying a computer readable program which when executed causes a computer to perform the steps of claim 1.

12. A system, comprising:

a controller for synchronously reconnecting a microgrid to a main grid after islanding of the microgrid, wherein said controller comprises:

a processor-based phase angle difference calculator for calculating a phase angle difference between synchrophasor measurements collected from a common coupling on the main grid and synchrophasor measurements collected from a common coupling on the microgrid;

a frequency reference deviation controller for calculating a frequency reference deviation based on the phase angle difference;

a frequency adjuster for adjusting a frequency of the diesel generator based on the frequency reference deviation; and a model selection unit for blocking synchronization control operations between the main grid and the microgrid responsive to a received mode selection for a grid-tied mode that ties the main grid to the microgrid and enabling the synchronization control operations responsive to a received mode selection for an island mode that islands the microgrid from the main grid.

13. The system of claim 12, further comprising a data aligner for performing data alignment to align the synchrophasor measurements collected from the point of common coupling on the main grid with the synchrophasor measurements collected from the point of common coupling on the microgrid in preparation for said calculating step.

14. The system of claim 12, further comprising:

a first buffer for storing the synchrophasor measurements from the point of common coupling on the main grid; and a second buffer for storing the synchrophasor measurements from the point of common coupling on the main grid, wherein the data aligner determines a leading one of, the synchrophasor measurements from the point of common coupling on the main grid and the synchrophasor measurements from the point of common coupling on the microgrid, based on measurement receive times at the first and second buffers, and wherein the data aligner causes a removal, from a corresponding one of the first buffer or the second buffer, of a number of measurements from the leading one.

15. The system of claim 12, further comprising an engine control unit for adjusting a mechanical power output of the diesel generator.

16. The system of claim 12, further comprising a phase angle adjuster for adjusting the phase angle difference to lie within a predetermined range before calculating the frequency reference deviation therefrom.

17. The system of claim 16, wherein the phase angle adjustor adjusts the phase angle difference to compensate for a periodic feature of an electromagnetic wave.

18. The system of claim 12, wherein the frequency adjuster adjusts the frequency of the diesel generator by synchronizing a voltage phase angle at the common coupling on the main grid with a voltage phase angle at the common coupling on the microgrid.

* * * * *